United States Patent
Blank et al.

[11] Patent Number: 5,935,614
[45] Date of Patent: Aug. 10, 1999

[54] APPARATUS FOR DIE CASTING THREE-LAYER ARTICLES

[75] Inventors: Michæl Blank, Wuppertal; Klaus Schramm, Essen, both of Germany

[73] Assignee: Fried Krupp AG Hoesch-Krupp, Essen and Dortmund, Germany

[21] Appl. No.: 08/941,907

[22] Filed: Oct. 1, 1997

[30] Foreign Application Priority Data

Oct. 2, 1996 [DE] Germany .......................... 196 40 662

[51] Int. Cl.[6] .................................................. B29C 45/16
[52] U.S. Cl. .......................... 425/130; 425/564; 425/572
[58] Field of Search .................................... 425/130, 564, 425/572

[56] References Cited

U.S. PATENT DOCUMENTS

| | | | |
|---|---|---|---|
| 3,947,175 | 3/1976 | Melcher ................................. | 425/130 |
| 4,657,496 | 4/1987 | Ozeki et al. ........................... | 425/130 |
| 4,946,365 | 8/1990 | Kudert et al. ......................... | 425/130 |

Primary Examiner—Tim Heitbrink
Attorney, Agent, or Firm—Max Fogiel

[57] ABSTRACT

A method of injection-molding three-layer moldings, especially bottle blanks, having inner and outer layers of a "material A" and of a "material B". Material B can be a material that acts as a barrier against the gases $O_2$, $CO_2$, and $SO_2$, and against water vapor ($H_2O$). The method employs a device that comprises at least one mold and at least one flat hot runner. The mold has several cavities and the hot runner has the same number of dies. Material A is supplied to the cavities (1.1) through an annular gap between the inner (2.1) and the outer (2.2) component of each die. Material B is forced into the cavities through a hollow needle (3) that extends through the center of the inner die component by a piston (4) that is integrated into the die and cannot rotate. The needle has a port (6) that opens into it at a right angle and remains open as long as the needle remains advanced, in a closing position, and that is blocked when the needle is retracted. A reservoir (3.3) constituted by the hollow inside the needle is charged through the port while the needle is in its closing position.

11 Claims, 6 Drawing Sheets

APPARATUS FOR DIE CASTING THREE-LAYER ARTICLES

BACKGROUND OF THE INVENTION

The present invention concerns first a method of injection-molding three-layer moldings, especially bottle blanks. They have inner and outer layers of a "material A" and a middle layer of a "material B". Material A can be polyethylene terephthalate (PET) for example. Material B is a material, a copolymer of ethylene and polyvinyl alcohol (EVAL) for example, that acts as a barrier against the gases $O_2$, $CO_2$, and $SO_2$, and against water vapor ($H_2O$). The method employs a device that comprises at least one mold and at least one flat hot runner. The mold has several cavities and the hot runner has the same number of dies. The two materials are supplied to the cavities through separate hot-runner systems. The invention also concerns such a device for carrying out the method.

The present invention is not, however, restricted either to bottle blanks or to PET. It can be used for injection molding moldings of any other plastic or combination of plastics for any other purpose. The invention can for example be employed for molding multiple-layer moldings of PET and polyethylene naphthalate (PEN). PEN is, like PET, polyester, although it has much better heat-resisting properties, overall mechanical properties, and barrier-forming properties. Although still fairly new, PEN has already been approved by the various governmental authorities as a packaging material in the foodstuffs industry. Due to its outstanding properties, even relatively small portions of PEN by weight of the blank contribute considerably to the quality of the finished bottle. Bottles made of PET or PEN are particular appropriate for bottling fruit juices hot and for storage in hot climates.

The middle layer in such blanks constitutes a core, and the inner and outer layer integral skins. The inner layer can also constitute a barrier layer. Such layers, especially those that create a barrier against the gases O2, CO2, and SO2, and against water vapor (H2O), are very important to blanks of this type because they decrease permeability.

The inner layers employed in known methods of the aforesaid genus are relatively thick. The thickness makes the blanks considerably more expensive because materials that can act as barriers are substantially more expensive than those that can be employed for outer layers. Another drawback of the known methods is the impossibility of distributing the materials employed for the barrier layers at all uniformly throughout all the cavities in a multiple-cavity mold (a mold with 32 or 48 cavities).

Since the material B to be employed as a barrier layer need not be exposed to as much heat as the material A in the outer layer, the two layers are supplied to the cavities through separate hot-runner systems. This causes considerable problems. One device (known from EO 0 246 512 B1) for simultaneously injection molding blanks with several layers accordingly features a separate source and separate ducts. A lot of material B, however, is always left in the die and in the immediately adjacent ducts after each cycle, and the material is exposed to too much heat before being introduced into the cavities.

SUMMARY OF THE INVENTION

The present invention is intended to eliminate the aforesaid drawbacks and to improve the generic method to the extent that the inner layer of the moldings can be considerably thinner and the molding itself considerably more cost effective to produce and to the extent that the material constituting the inner layer will be uniformly and reproducibly distributed throughout all the cavities.

This object is attained in accordance with the present invention in the generic method in that material A is supplied to the cavities through an annular gap between the inner and the outer component of each die and material B is forced into the cavities through a hollow needle that extends through the center of the inner die component by a piston that is integrated into the die and cannot rotate and in that the needle has a port that opens into it at a right angle and remains open as long as the needle remains advanced, in a closing position, and that is blocked when the needle is retracted, whereby a reservoir constituted by the hollow inside the needle is charged through the port while the needle is in its closing position.

The charging procedure and the stroke of the piston can be regulated to adjust very precisely and reproducibly from cycle to cycle how much material B is distributed to all the cavities and hence how thick the middle layer will be. The method in accordance with the present invention will also ensure very uniform thickness on the part of the inner layer, the barrier layer.

The needle is entirely emptied during each cycle, and material B is accordingly subjected to high heat only during mold emptying and injection, an extraordinarily brief time.

One advantageous embodiment of the method in accordance with the present invention is characterized by first supplying enough material A to constitute a single portion through the annular gap between the inner and the outer die component with the needle retracted and the port blocked and with the piston also retracted, then supplying more material A along with material B while the needle remains stationary but the piston advances, then injecting more material A with the needle still stationary and its reservoir empty of material B and dwell compressing and decompressing material A, then advancing the needle until it comes into contact with the outer die component, closing the feed, and retracting the needle, charging the reservoir with material B, and finally decompressing material B and removing the molding.

The problems that accompany the known methods cannot occur when the method in accordance with the present invention is employed.

Another advantageous embodiment of the method in accordance with the present invention comprises first supplying enough material A to constitute a single portion through the annular gap between the inner and the outer die component with the needle retracted and the port blocked and with the piston also retracted, then supplying enough material B to constitute a single portion from the reservoir while the needle remains stationary but the piston advances, then supplying both material A and material B with the needle still stationary while the piston advances until it comes into contact with the cone at the needle's outlet then dwell compressing and decompressing material A, then advancing the needle until it comes into contact with the outer die component, closing the feed, and retracting the needle, charging the reservoir with material B, and finally decompressing material B and removing the molding.

The problems that accompany the known methods can also not occur when this embodiment of the method in accordance with the present invention is employed.

The stroke traveled by the needle and the advanced, emptying, position of the piston are synchronized in the aforesaid embodiments of the method in accordance with the present invention such that the cylindrical entrance to the reservoir will remain blocked once the needle has advanced into the closing position.

Still another advanced embodiment of the method in accordance with the present invention comprises simultaneously advancing both the needle and the piston into the closing position once material B has been expelled, forcing all the remaining material A into the cavities. In this event, a longitudinal groove that provides communication between the port and the reservoir and extends as far as the port in the aforesaid embodiments of the method in accordance with the present invention, also extends somewhat beyond it.

Further embodiments of the method in accordance with the present invention are recited in subsidiary claims 4 through 8.

The device for carrying out the method comprises at least one mold and at least one flat hot runner. The mold has several cavities and the hot runner the same number of dies. A needle slides back and forth in each die.

This device attains the object of the present invention in that the needle is hollow and a piston slides back and forth inside it without rotating, whereby the inside of the needle constitutes a reservoir for material B, in that the needle has a port extending into it at a right angle in the vicinity of the hot-runner system for material B and the piston has a longitudinal groove that extends as far as the port, whereby the port and the groove allow material B to flow out of a supply line and into the reservoir, and in that the port is positioned such that the reservoir can be charged only while the needle is in its advanced position, the closing position, the port being blocked as long as the needle is in its retracted position.

The hot-runner system for material A is conventional in design and its temperature can be independently controlled. The sole function of the hot-runner system for the barrier material, material B, is to charge the reservoir. The system is provided with material B from a plasticizer mounted on the mold. This practical measure is possible because of the low proportion of material B.

The hot-runner system for material B does not require rheological equilibration because the reservoir is charged subject to a prescribed pressure in accordance with the law of communicating capillaries, meaning that all the reservoirs in the device will be equally charged in a specified time.

BRIEF DESCRIPTION OF THE DRAWINGS

Several embodiments of the method and device in accordance with the present invention will now be specified with reference to the accompanying drawing, wherein.

DESCRIPTION OF THE PREFERRED EMBODIMENTS

Figure 1:
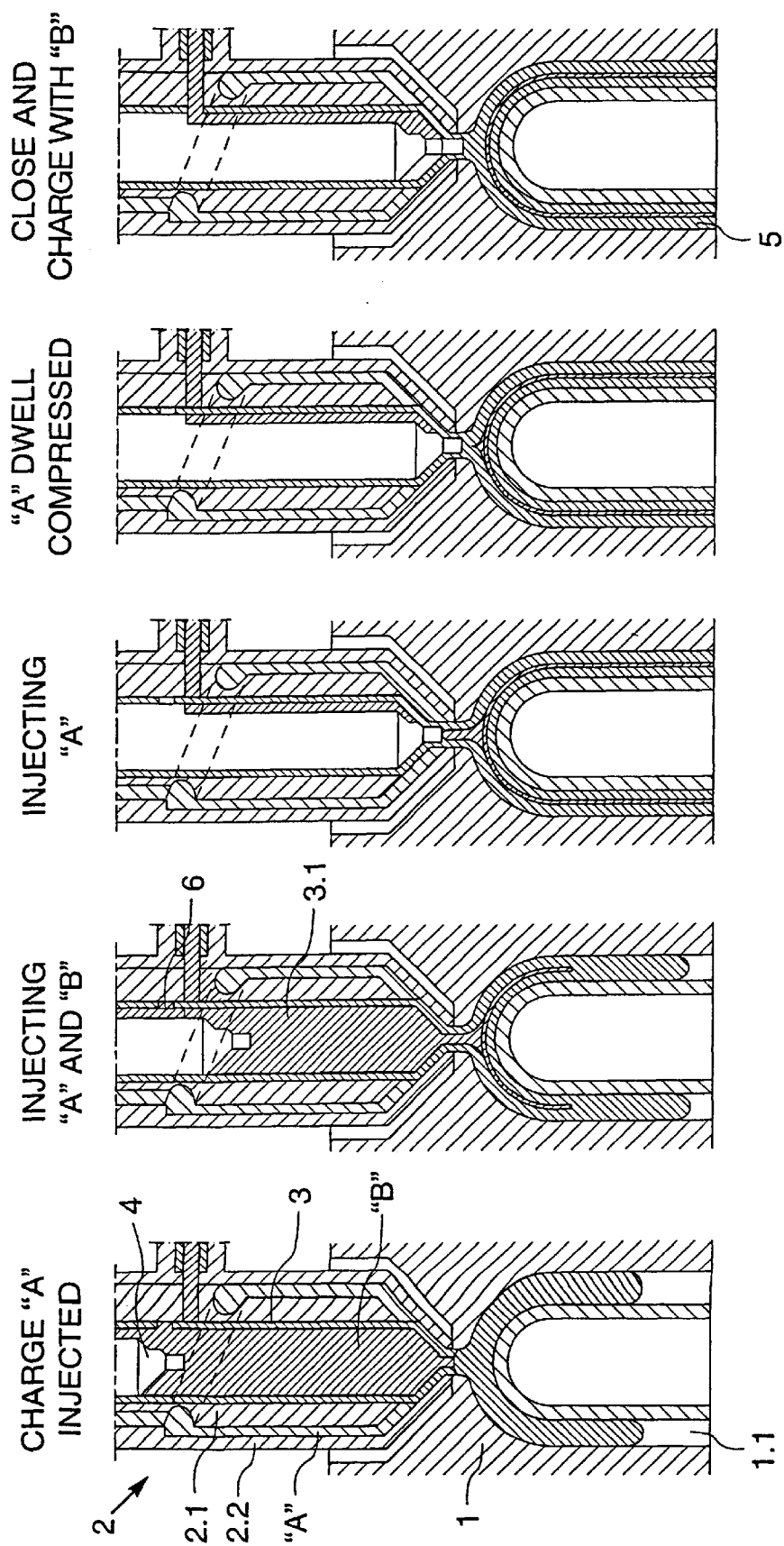
FIG. 1 illustrates the components of a die in various positions during various steps of a method embodying one injection-molding principle, FIG. 2 the pressures that occur over time in the antechamber upstream of a die during that embodiment, FIG. 3 the components of a die in various positions during various steps of a method embodying another injection-molding principle, and FIG. 4 the pressures that occur over time in the antechamber upstream of a die during that embodiment.
Figure 3:
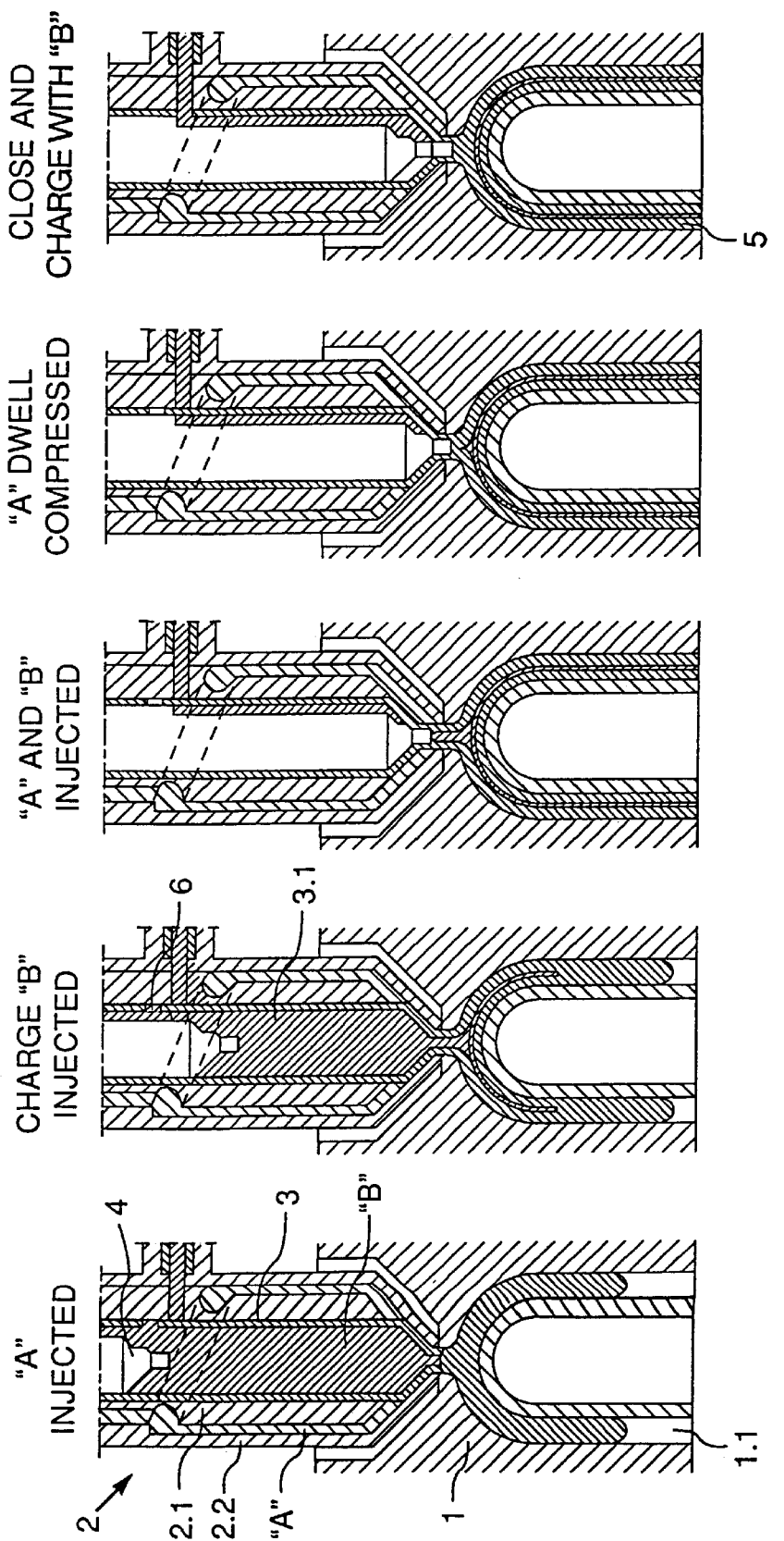

FIGS. 1 and 3 illustrate by way of example embodiments with a mold 1. Mold 1 is provide with cavities 1.1 and an injection-molding die 2. Die 2 comprises an inner component 2.1 and an outer component 2.2. A hollow needle 3 slides back and forth inside inner die component 2.1. Integrated into needle 3 is a piston 4. When piston 4 is retracted, it creates a reservoir 3.1 inside needle 3. Moldings 5 are produced in the cavities 1.1 in mold 1 by the method specified herein.

In the embodiment illustrated by way of example in FIGS. 1 and 3, a material A is introduced into cavities 1.1 through an annular gap between die components 2.1 and 2.2 with both needle 3 and piston 4 retracted. A material B is introduced through needle 3.

Figure 2:
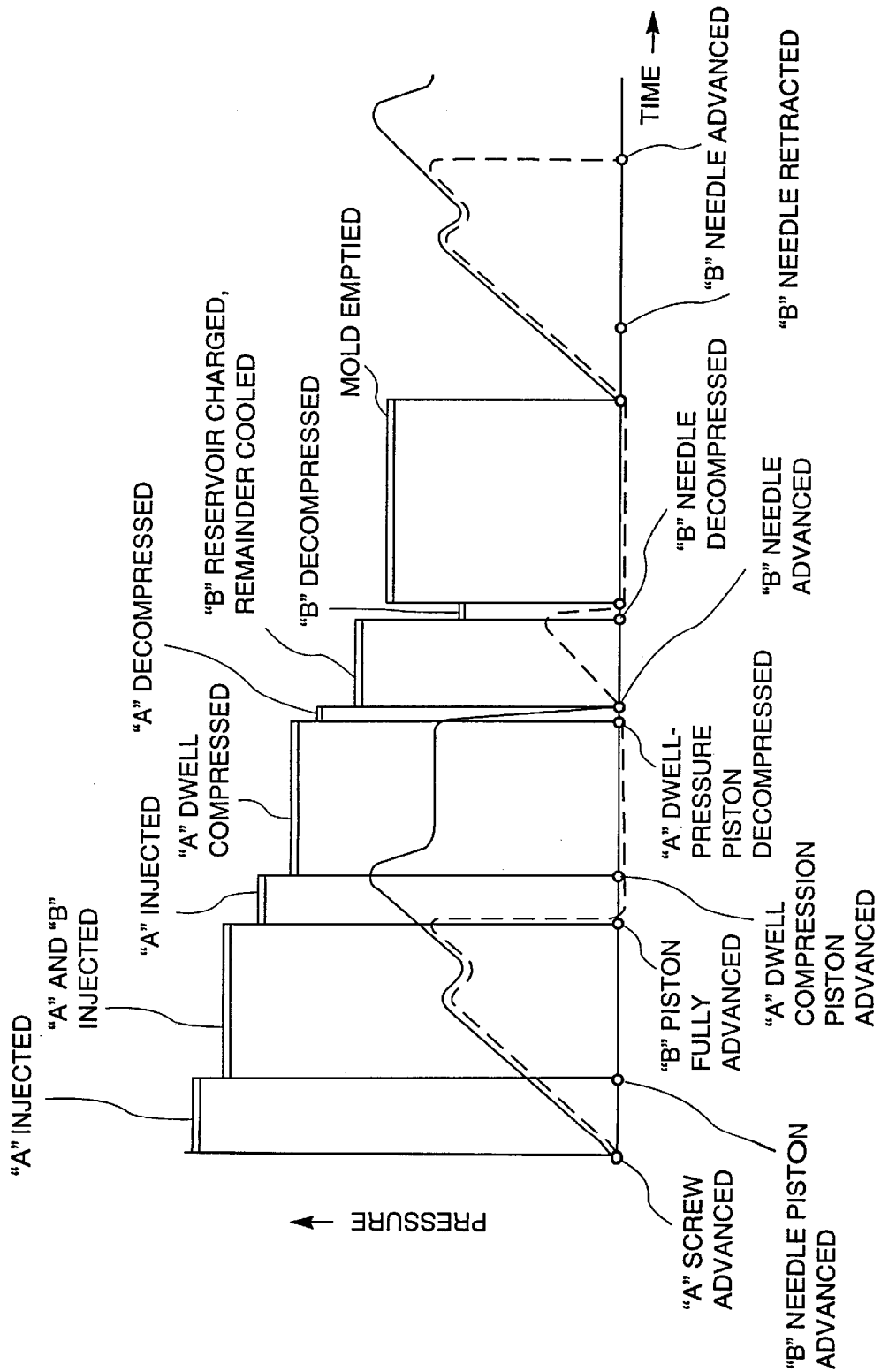
Figure 4:
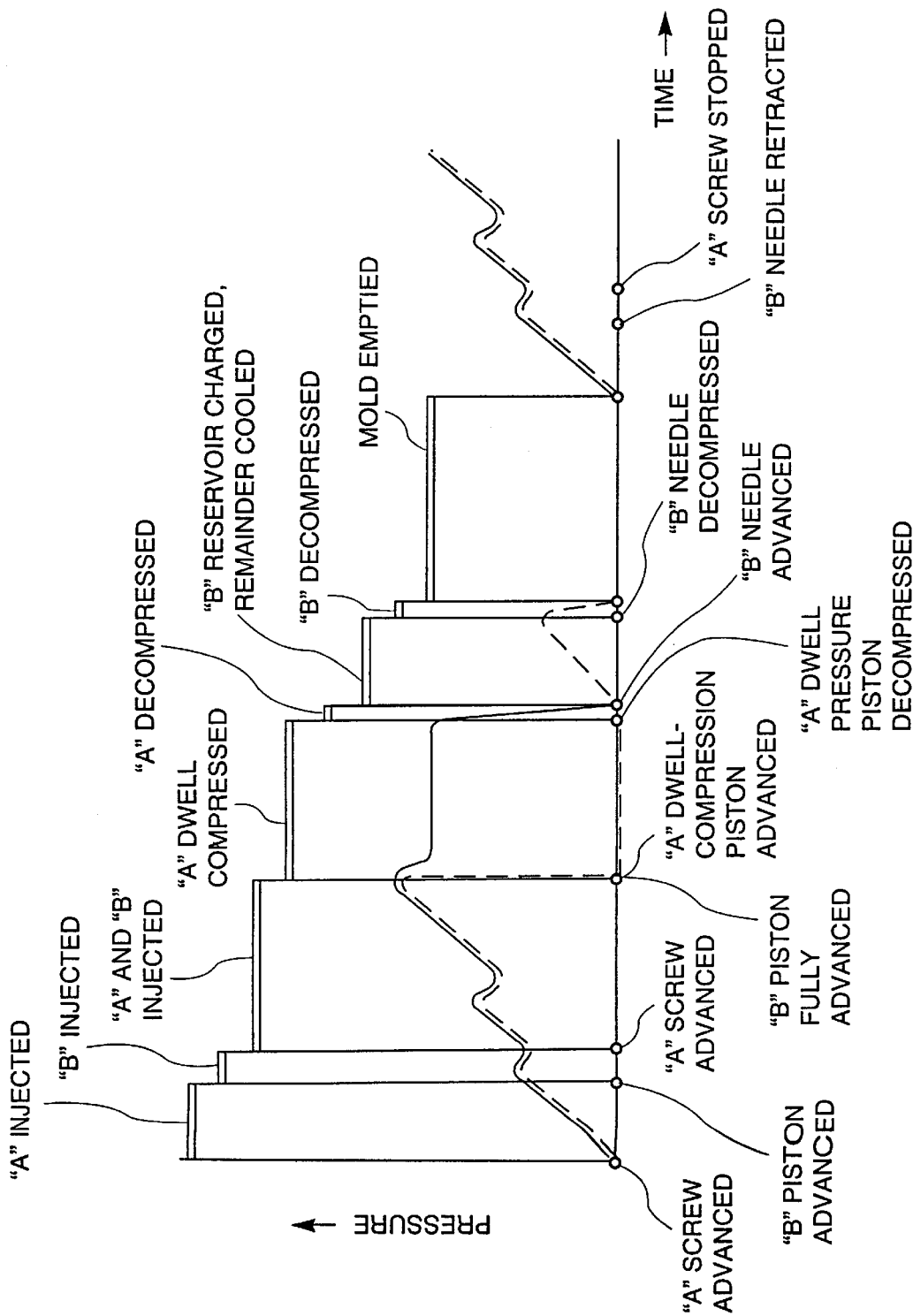

The various steps of the embodiment illustrated in FIGS. 1 and 3 and in FIGS. 2 and 4 are sufficiently specified by the call-outs and will not be discussed in detail. The pressures relating to material A in FIGS. 2 and 4 are plotted by a continuous line and those relating to material B by a discontinuous line.

Figure 5:
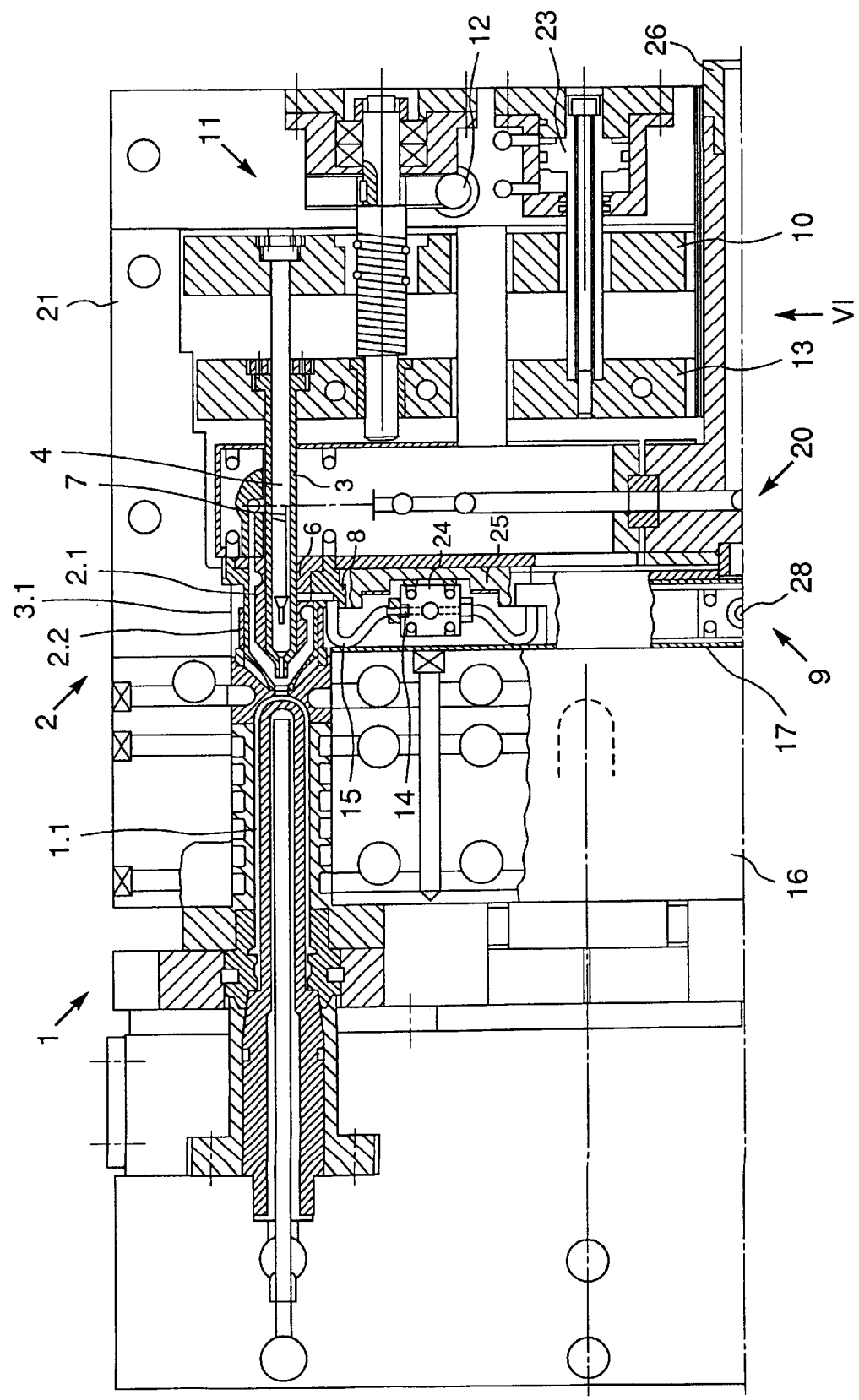
FIG. 5 is a partly sectional top view of a mold.

Materials A and B (cf. FIGS. 1 and 3) are supplied to the cavities 1.1 of the mold 1 illustrated in FIG. 5 through dies 2. Each die 2 comprises an inner component 2.1 and an outer component 2.2. Accommodated in inner die component 2.1 is a hollow needle 3 that in turn accommodates a piston 4 that cannot rotate. Needle 3 is provided with a port 6 that is closed while in the illustrated position. Port 6 is in the vicinity of a longitudinal groove 7 in piston 4. A line 8 that supplies material B communicates with the reservoir 3.1 in needle 3 through groove 7.

Figure 6:
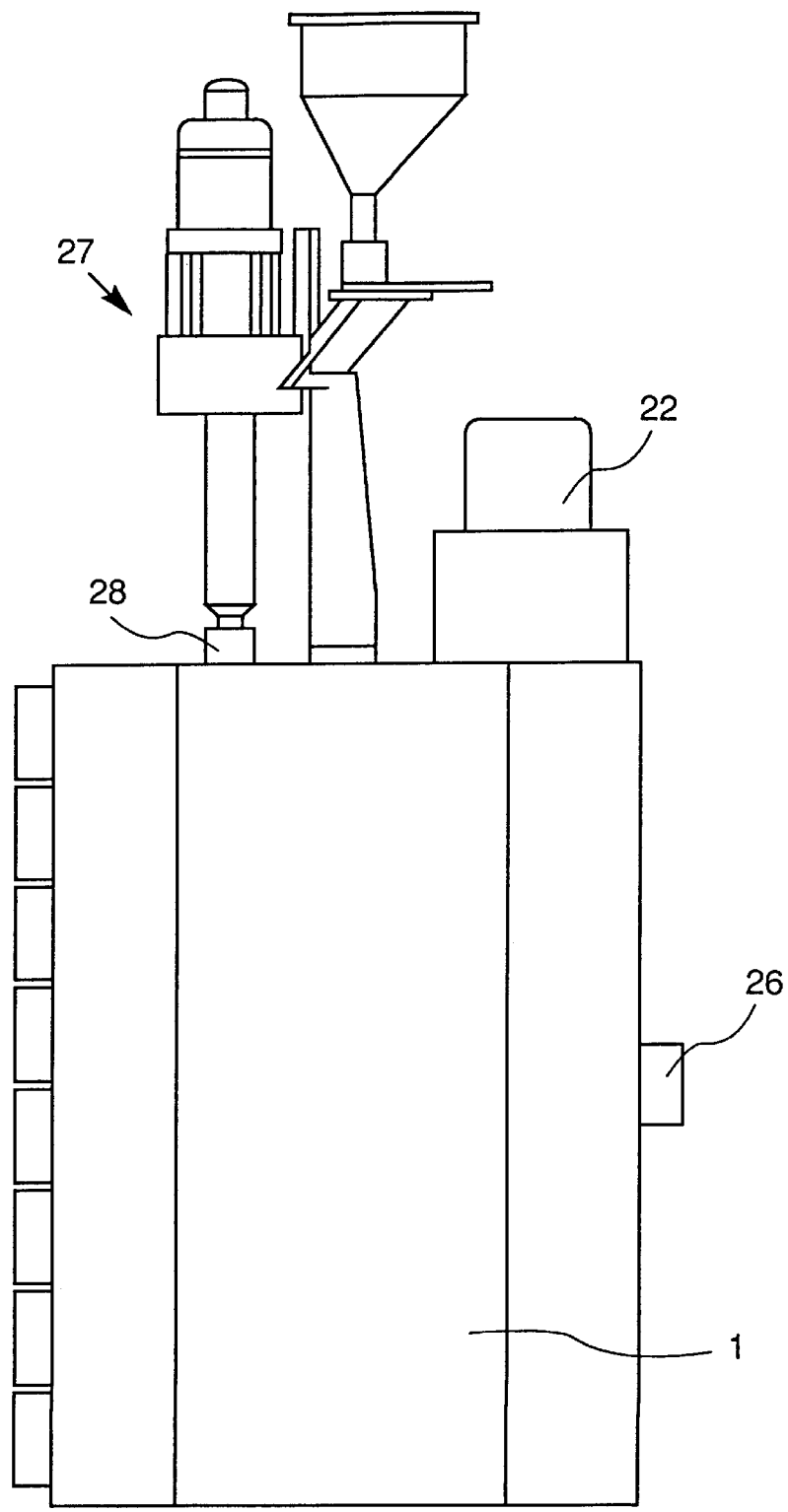
FIG. 6 is a front view of the die-side half of the mold illustrated in FIG. 5 as viewed along the direction indicated by arrow VI in that figure.

Dies 2 are secured in a flat hot runner 21. The ends of each piston 4 that point away from a die 2 are fastened to a flat base 10. Base 10 travels back and forth subject to a ball-and-screw transmission 11. The screws 12 are driven by a variable three-phase servo motor 22 (FIG. 6). This system allows portion-regulated charging of reservoir 3.1 with material B, the barrier material, and following a precise pattern with the material during both continuous and discontinuous injection molding.

The whole procedure is made possible by the characteristics of the motor, specifically constant torque over its total speed range, high dynamics (from 0 to nominal speed in 25 msec), low friction, high overload capacity, nominal torque even while accelerating and decelerating, very consistent rate of rotation at nominal speeds of 2000 to 8000 rpm, and small size and high output.

Position and speed controls allow precise reproduction of master patterns from cycle to cycle.

Needles 3 are all secured in the same base 13. Bases 10 and 13 can be driven in and out independently. Base 10 is driven by the aforesaid transmission 11 and base 13 by hydraulic cylinders 23.

Material B is supplied through tubes 14. A reflector tube 15 communicates with a melt distributor 24.

The hot-runner system 9 for material B is thermally insulated from the hot-runner system 20 for material A by a partition 25.

Also accommodated in mold 1 are stops 18 and 19 that establish the zero or farthest-down positions of bases 10 and 13.

As will be evident from FIG. 6, material A is conventionally supplied to hot-runner system 20 (FIG. 5) from an unillustrated machine die through a feed bushing 26 and material B to hot-runner system 9 (FIG. 5) from a plasticizer mounted on mold 1 through another feed bushing 28.

We claim:

1. Apparatus for injection-molding three-layer moldings with inner and outer layers of a first material and a middle layer of a second material forming a barrier against gases corresponding to $O_2$, $CO_2$ and $SO_2$, and against water vapor; comprising: at least one mold and at least one hot runner plate; said mold having a plurality of cavities; injection die nozzles in said hot runner plate and corresponding in number to said cavities; separate hot-runner systems for supplying said first and second materials to said cavities; each die nozzle having an inner and an outer component, said first material being supplied through an annular gap between said inner and said outer component; a hollow needle extending through a center of the inner die component by a non-rotatable piston integrated into the die nozzle for forcing said second material into said cavities; said needle having a portion at a right angle to said needle; means for holding said opening open as long as said needle remains advanced in a closing position; means for blocking said opening when said needle is retracted; a reservoir formed by a hollow inside said needle and charged through said port while said needle is in the closing position, said needle sliding back and forth in each die nozzle, said piston sliding back and forth inside said needle and having a longitudinal groove extending as far as said port, said port and said groove allowing said second material to flow out of a supply line and into said reservoir; said port having a position for charging said reservoir only while said needle is advanced in said closing position, said port being blocked as long as said needle is in a retracted position.

2. Apparatus as defined in claim 1, including a first flat base for securing all needles; a second flat base for securing all pistons, said first base and said second base traveling in and out independently of each other.

3. Apparatus as defined in claim 2, wherein said first base and said second base are rectangular with four outer corners guided inside the mold.

4. Apparatus as defined in claim 2, including at least one hydraulic cylinder for actuating said second base.

5. Apparatus as defined in claim 2, including a ball-and-screw transmission with a screw connected to a variable three-phase servo motor for actuating said first base.

6. Apparatus as defined in claim 1, including bent tubes for supplying said second material to said die nozzles from a melt distributor and simultaneously compensating for thermal expansion.

7. Apparatus as defined in claim 6, including an aluminum reflector tube for holding loosely each of said bent tubes.

8. Apparatus as defined in claim 1, including a partition for thermally insulating the hot-runner system associated with said second material from the hot-runner system associated with said first material.

9. Apparatus as defined in claim 1, including a sheet of reflecting metal between the hot-runner system associated with said second material and a bottom-die plate.

10. Apparatus as defined in claim 2, including stops in said mold to form farthest-down positions for said first base and said second base.

11. Apparatus as defined in claim 1, wherein said first material is polyethylene terephthalate (PET) and said second material is a copolymer of ethylene and polyvinyl alcohol (EVAL).

* * * * *